(12) United States Patent
Takagi

(10) Patent No.: US 9,494,979 B2
(45) Date of Patent: Nov. 15, 2016

(54) OPERATION DETECTION APPARATUS

(71) Applicant: SONY CORPORATION, Tokyo (JP)

(72) Inventor: Yoshinori Takagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/399,654

(22) PCT Filed: Jun. 20, 2013

(86) PCT No.: PCT/JP2013/066986
§ 371 (c)(1),
(2) Date: Nov. 7, 2014

(87) PCT Pub. No.: WO2014/034233
PCT Pub. Date: Mar. 6, 2014

(65) Prior Publication Data
US 2015/0109222 A1 Apr. 23, 2015

(30) Foreign Application Priority Data
Aug. 31, 2012 (JP) .................................. 2012-190985

(51) Int. Cl.
| | | |
|---|---|---|
| *G06F 1/16* | (2006.01) | |
| *B01J 23/30* | (2006.01) | |
| *B01J 21/06* | (2006.01) | |
| *G06F 3/041* | (2006.01) | |
| *B01J 35/00* | (2006.01) | |

(52) U.S. Cl.
CPC ............ *G06F 1/1643* (2013.01); *B01J 21/063* (2013.01); *B01J 23/30* (2013.01); *B01J 35/004* (2013.01); *G06F 3/041* (2013.01)

(58) Field of Classification Search
CPC ....................................................... G06F 3/044
See application file for complete search history.

(56) References Cited

U.S. PATENT DOCUMENTS

| | | | | |
|---|---|---|---|---|
| 2009/0246091 A1* | 10/2009 | Vanderspurt | ......... | B01D 53/885 422/122 |
| 2010/0316851 A1* | 12/2010 | Hirai | ....................... | G06F 3/044 428/195.1 |
| 2014/0011013 A1* | 1/2014 | Jin | ........................... | B05D 5/08 428/297.4 |

FOREIGN PATENT DOCUMENTS

| | | |
|---|---|---|
| JP | 2002-53345 A | 2/2002 |
| JP | 2003-316504 A | 11/2003 |
| JP | 2005-149102 A | 6/2005 |
| JP | 2006-331243 A | 12/2006 |

OTHER PUBLICATIONS

International Search Report issued Aug. 13, 2013 in PCT/JP2013/066986.

* cited by examiner

*Primary Examiner* — Seokyun Moon
*Assistant Examiner* — Peijie Shen
(74) *Attorney, Agent, or Firm* — Chip Law Group

(57) ABSTRACT

There is provided an operation detection apparatus including an operation detection layer, and a photocatalystic layer laminated on the operation detection layer. The photocatalystic layer has an ununiform amount of photocatalysts formed therein.

6 Claims, 8 Drawing Sheets

AREAS HAVING PHOTOCATALYSTS AT HIGH CONCENTRATION

AREAS HAVING PHOTOCATALYSTS AT LOW CONCENTRATION

OPERATION DETECTION APPARATUS

TECHNICAL FIELD

The present disclosure relates to an operation detection apparatus.

BACKGROUND ART

Having the functions of operation detection apparatuses and display apparatuses, touch panels are gaining widespread use today. Users can provide intuitive operations to the touch panels.

Meanwhile, photocatalysts represented by titanium oxide attract attention. Photocatalysts are characterized in oxidation-reduction reactions upon reception of light. Patent Literature 1, for example, discloses glass covered with photocatalytic film which has photocatalysts applied thereto, and has the self-cleaning function of photocatalysts.

CITATION LIST

Patent Literature

Patent Literature 1: JP 2002-53345A

SUMMARY OF INVENTION

Technical Problem

Since users operate touch panels with their finger in most cases, the touch panels frequently have sebum on the surfaces. Sebum adhering to the surfaces of touch panels makes the display of the touch panels less visible. Thus, it has been devised to form photocatalysts on the surfaces of touch panels in order to automatically decompose extraneous matters adhering to the touch panels.

Photocatalysts, however, cause current noise in decomposing extraneous matters because of oxidation-reduction reactions. Accordingly, if photocatalysts are formed on touch panels, the function of the touch panels in terms of operation detection apparatuses would be possibly lost owing to the current noise.

The present disclosure has devised a novel and improved operation detection apparatus for combining both functions of decomposing extraneous matters with photocatalysts and detecting operations.

Solution to Problem

According to the present disclosure, there is provided an operation detection apparatus including an operation detection layer, and a photocatalytic layer laminated on the operation detection layer. The photocatalytic layer has an ununiform amount of photocatalysts formed therein.

Advantageous Effects of Invention

According to the present disclosure as described above, it is possible to combine both functions of decomposing extraneous matters with photocatalysts and detecting operations.

DESCRIPTION OF EMBODIMENTS

Hereinafter, preferred embodiments of the present disclosure will be described in detail with reference to the appended drawings. Note that, in this description and the drawings, elements that have substantially the same function and structure are denoted with the same reference signs, and repeated explanation is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

The present disclosure will be described in the following order.
1. Basic Configuration of Mobile Terminal
2. Configuration of Touch Panel
3. Modified Examples
4. Conclusion <1. Basic Configuration of Mobile Terminal>

As an example is described below, the technology according to the present disclosure may be implemented in a variety of embodiments. A touch panel 30 (operation detection apparatus) according to an embodiment of the present disclosure includes
A. an operation detection layer (320), and
B. a photocatalytic layer (330) laminated on the operation detection layer, and
C. the photocatalytic layer has an ununiform amount of photocatalysts formed therein.

First of all, the basic configuration of a mobile terminal 20 will be described below, the mobile terminal 20 including this touch panel 30.

Figure 1:
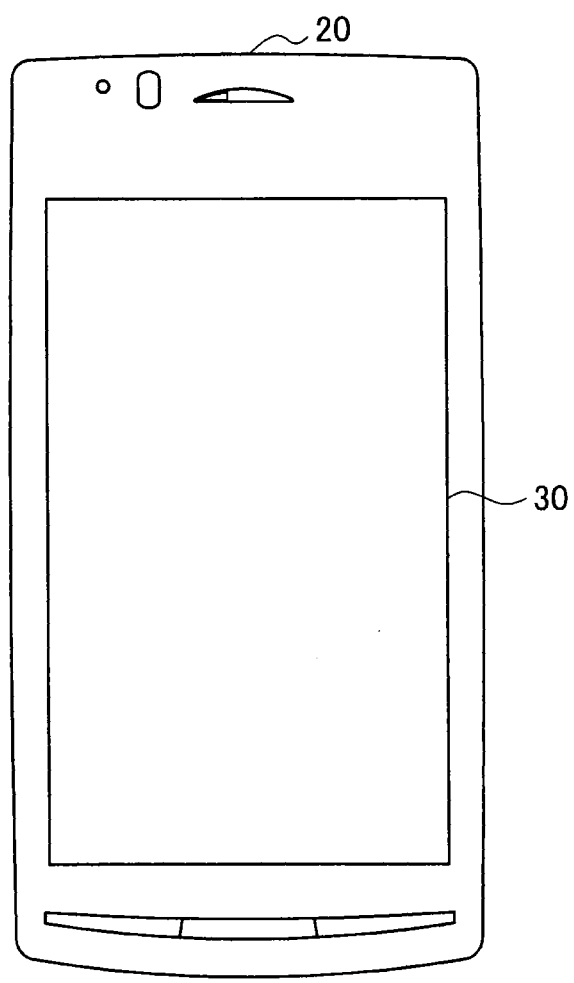
FIG. 1 is an explanatory diagram illustrating a configuration of a mobile terminal according to an embodiment of the present disclosure.

FIG. 1 is an explanatory diagram illustrating the configuration of the mobile terminal 20 according to an embodiment of the present disclosure. FIG. 1 shows that the mobile terminal 20 according to the embodiment of the present disclosure includes the touch panel 30. The touch panel 30 has the functions of display apparatuses and operation detection apparatuses, the display apparatuses displaying a variety of display screens, the operation detection apparatuses detecting operation inputs from users. The function of display apparatuses is implemented, for example, by cathode ray tube (CRT) display apparatuses, liquid crystal display (LCD) apparatuses, and organic light emitting diode (OLED) apparatuses. Meanwhile, the function of operation detection apparatuses is implemented by resistive film touch pads, capacitive touch pads, or the like.

Although FIG. 1 illustrates a smartphone as an example of the mobile terminal 20, on which the touch panel 30 is installed, the mobile terminal 20 is not limited to the example. The smartphone 20 may be an information processing apparatus such as cell phones, personal handy-phone systems (PHSs), portable music players, and mobile video processors.

(Hardware Configuration)

Figure 2:
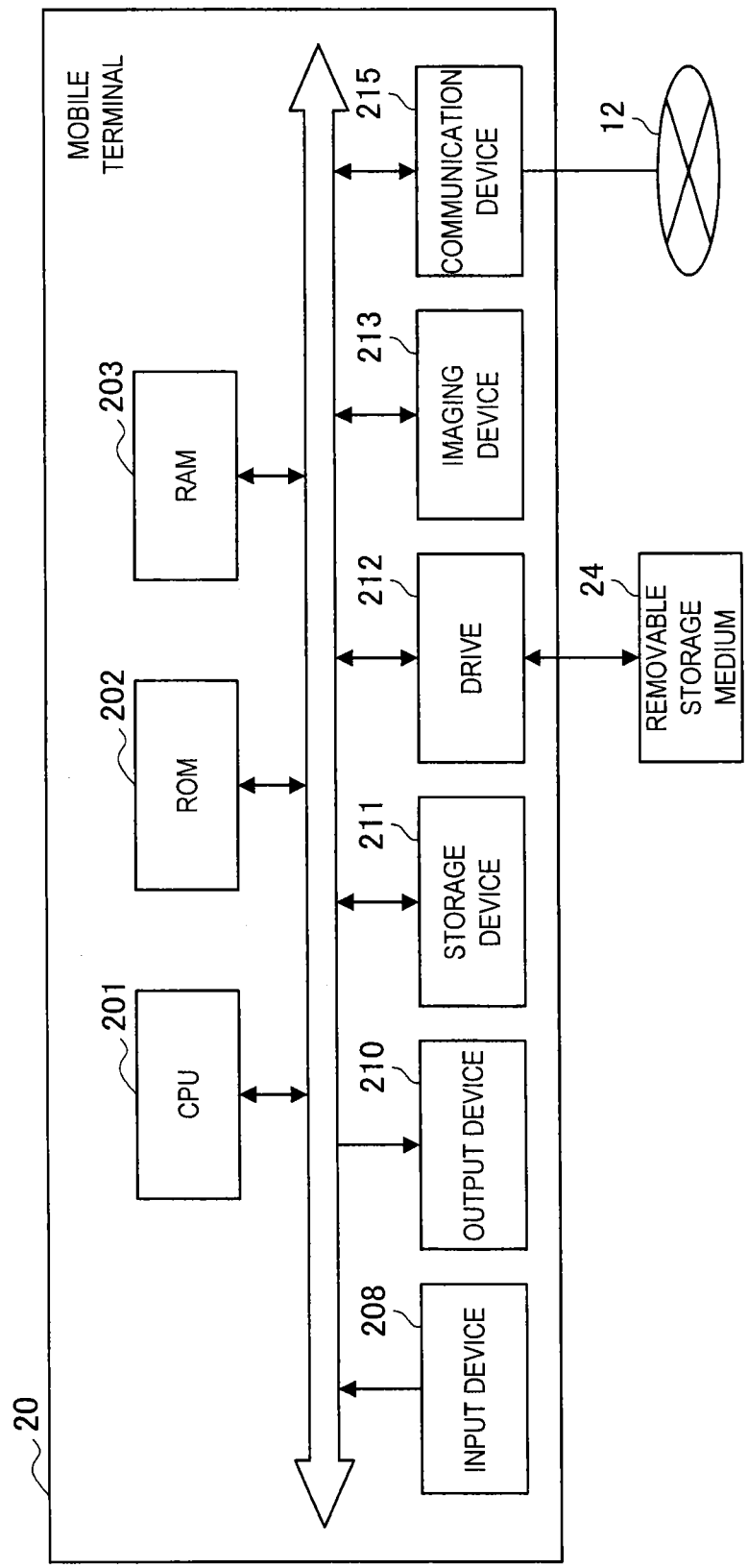
FIG. 2 is an explanatory diagram illustrating a hardware configuration of a mobile terminal.

Next, the hardware configuration of the mobile terminal 20 will be described with reference to FIG. 2. FIG. 2 is an explanatory diagram illustrating the hardware configuration of the terminal apparatus 20. FIG. 2 shows that the mobile terminal 20 includes a central processing unit (CPU) 201, read only memory (ROM) 202, random access memory (RAM) 203, an input device 208, an output device 210, a storage device 211, a drive 212, an imaging device 213, and a communication device 215.

The CPU 201 functions as a processing device and a control device, and controls the whole operation of the terminal apparatus 20 in accordance with a variety of programs. The CPU 201 may also be a microprocessor. The ROM 202 stores a program, an operation parameter, or the like that is used by the CPU 201. The RAM 203 temporarily stores a program used upon execution of the CPU 201, a parameter that changes as necessary for the execution, or the like. These are connected to each other by a host bus including a CPU bus.

The input device 208 includes an input means such as mouses, keyboards, buttons, microphones, switches, and levers for a user to input information, and an input control circuit that generates an input signal on the basis of the input from the user and outputs the input signal to the CPU 201. A user of the mobile terminal 20 can input a variety of data to the mobile terminal 20 and require the mobile terminal 20 to perform a processing operation by operating the input device 208.

The output device 210 includes a display device such as liquid crystal display (LCD) devices, organic light emitting diode (OLED) devices, and lamps. The output device 210 further includes an audio output device such as speakers and headphones. The display device, for example, displays a shot image, a generated image, and the like. Meanwhile, the audio output device converts audio data and the like to a sound, and outputs the sound. Additionally, the touch panel 30 described with reference to FIG. 1 corresponds to the input device 208 and the output device 210 illustrated in FIG. 2.

The storage device 211 is a data storage device configured as an example of the storage unit of the mobile terminal 20 according to the present embodiment. The storage device 211 may include a storage medium, a recording device that records data on a storage medium, a read-out device that reads data out from a storage medium, and a deletion device that deletes data recorded on a storage medium. The storage device 211 stores a program and a variety of data executed by the CPU 201.

The drive 212 is a reader/writer for a storage medium, and is built in or externally attached to the mobile terminal 20. The drive 212 reads out information recorded on a removable storage medium 24 such as mounted magnetic disks, optical discs, magneto-optical disks and semiconductor memory, and outputs the read-out information to the RAM 203. The drive 212 can also write information into a removable storage medium 24.

The imaging device 213 includes an imaging optical system such as photographing lenses and zoom lenses that condense light, and a signal conversion element such as charge coupled devices (CCDs) and complementary metal oxide semiconductors (CMOSs). The imaging optical system condenses light emitted from a subject to form an image of the subject on a signal conversion unit. The signal conversion unit converts the formed image of the subject into an electrical image signal.

The communication device 215 is, for example, a communication interface including a communication device and the like for a connection to a network 12. The communication device 215 may also be a communication device supporting wireless local area networks (LANs), a communication device supporting Long Term Evolution (LTE), or a wired communication device performing wired communication.

Additionally, the network 12 is a wired or wireless transmission path through which information is transmitted from an apparatus connected to the network 12. The network 12 may include public networks such as the Internet, telephone networks and satellite networks, a variety of local area networks (LANs) including Ethernet (registered trademark), and wide area networks (WANs). The network 12 may also include leased line networks such as Internet protocol-virtual private networks (IP-VPNs).

<2. Configuration of Touch Panel>

The basic configuration of the mobile terminal 20 according to the embodiment of the present disclosure has been described so far. Next, the configuration of the touch panel 30 installed on the mobile terminal 20 will be more specifically described with reference to FIGS. 3 to 5.

Figure 3:
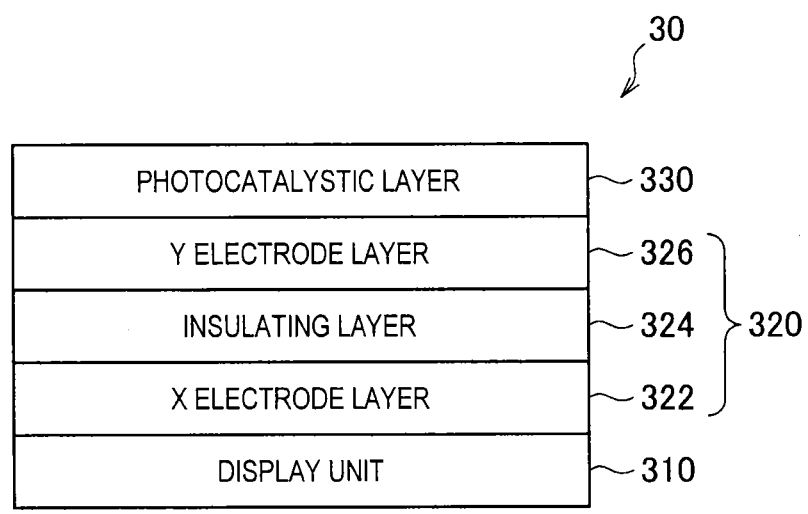
FIG. 3 is an explanatory diagram schematically illustrating a layer configuration of a touch panel.

FIG. 3 is an explanatory diagram schematically illustrating the layer configuration of the touch panel 30. FIG. 3 shows that the touch panel 30 is made chiefly of a lamination of a display unit 310, an operation detection layer 320, and a photocatalystic layer 330.

(Operation Detection Layer)

The operation detection layer 320 includes an X electrode layer 322, an insulating layer 324, and a Y electrode layer 326. The X electrode layer 322 includes an X electrode group arranged in an X direction, while the Y electrode layer 326 includes a Y electrode group arranged in a Y direction orthogonal to the X direction. The touch panel 30 can identify a position touched by a user by combining a result of the detection of the X electrode group with a result of the detection of the Y electrode group.

(Photocatalystic Layer)

The photocatalystic layer 330 has photocatalysts such as titanium oxide and tungsten therein. Since photocatalysts have the self-cleaning function to automatically decompose extraneous matters, the touch panel 30 according to the present embodiment, which includes the photocatalystic layer 330, can automatically decompose, for example, an extraneous matter adhering to the touch panel 30, the extraneous matter being derived from living organisms, to improve the visibility of the display. The overview of the self-cleaning function of photocatalysts will be described with reference to FIG. 4.

Figure 4:
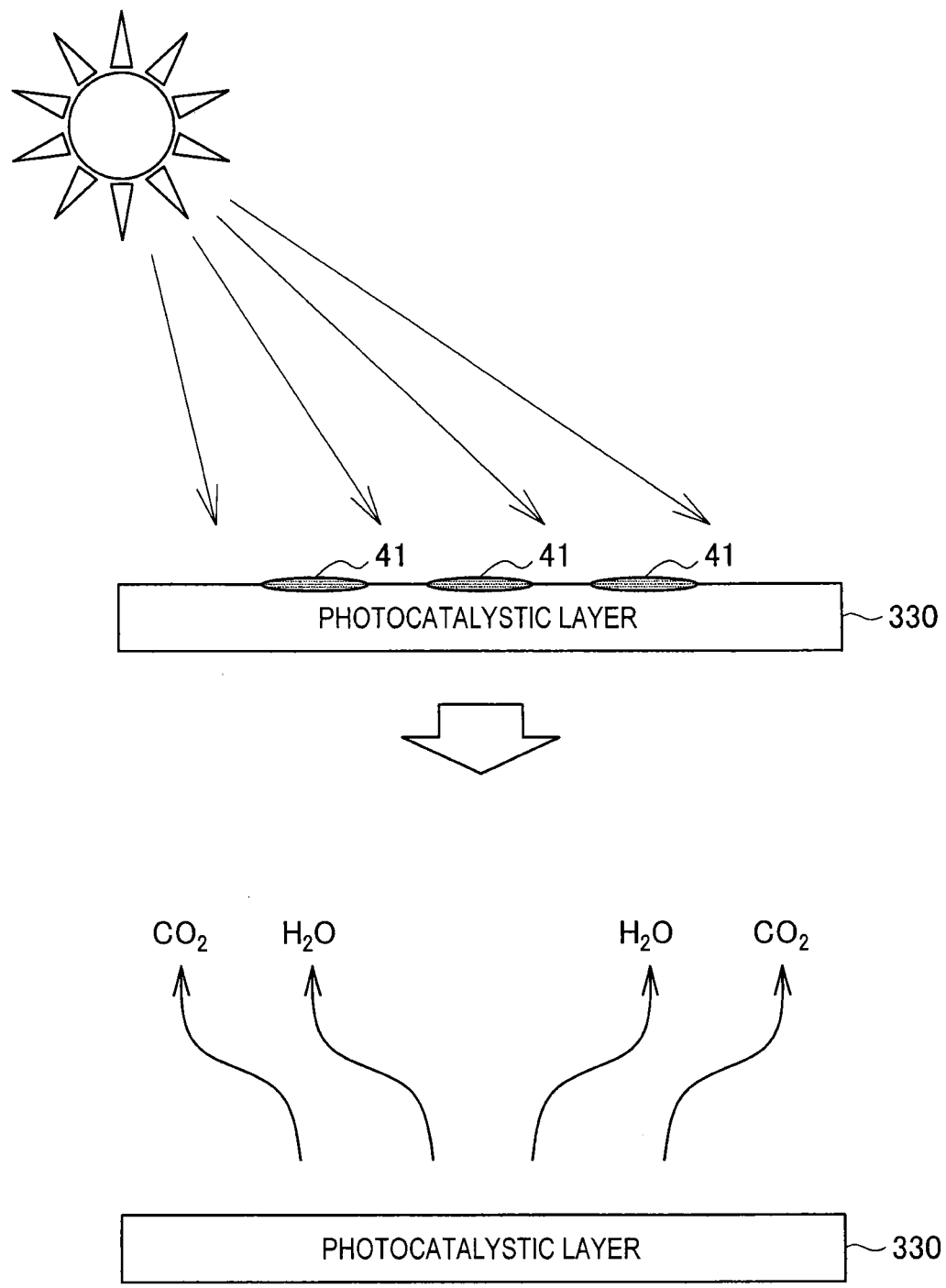
FIG. 4 is an explanatory diagram illustrating a self-cleaning function of a photocatalyst.

FIG. 4 is an explanatory diagram illustrating the self-cleaning function of photocatalysts. The upper part of FIG. 4 shows that light (ultraviolet rays) emitted onto the photocatalystic layer 330 activates oxidation-reduction reactions in the photocatalystic layer 330 when extraneous matters 41 are adhering to the photocatalystic layer 330. The extraneous matters 41 are decomposed in the process of these oxidization-reduction reactions, and $CO_2$ and $H_2O$ are generated to remove the extraneous matters 41 as illustrated in the lower part of FIG. 4.

The photocatalystic layer 330, however, causes current noise in decomposing the extraneous matters 41 because of the oxidization-reduction reactions. The present embodiment takes into consideration the effects of the current noise on the operation detection of the operation detection layer 320, so that the photocatalystic layer 330 has photocatalysts ununiformly formed therein. Specifically, the touch panel 30 has photocatalysts formed in a first area for operation detection at lower concentration (amount per unit area) than in a second area for information display. This point will be described below with reference to FIG. 5.

Figure 5:
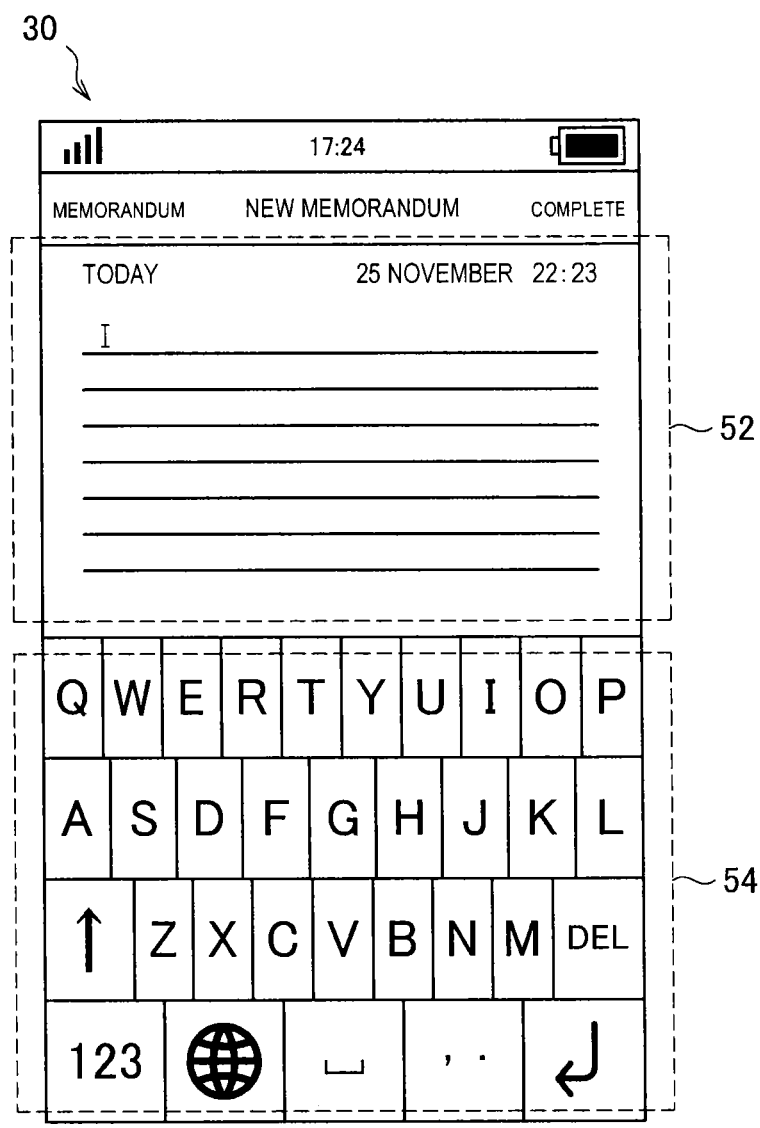
FIG. 5 is an explanatory diagram illustrating a specific example of a display screen of a touch panel.

FIG. 5 is an explanatory diagram illustrating a specific example of a display screen of the touch panel 30. FIG. 5 shows that an area 52 is an area (operation non-detection area) for information display which may be used for displaying information, while an area 54 is an area for operation detection which may be used for detecting an operation. Photocatalysts are formed in this area 54 for operation detection at lower concentration than in the area 52 for information display in the present embodiment.

Such a configuration reduces the amount of current noise caused in the area 54 because of oxidization-reduction reactions, so that it is possible to ensure the accuracy of operation detection in the area 54. Meanwhile, the area 52 for information display, at which users are more likely to gaze, has an enhanced capacity for decomposing extraneous matters, so that the visibility of the area 52 can be improved.

Additionally, the positional relationship between an area for operation detection and an area for information display may vary depending on a type of screen. Photocatalysts having low concentration and photocatalysts having high concentration are formed at least in accordance with the arrangement of an area for operation detection and an area for information display on a screen, allowing the advantageous effects to be attained on the screen.

<3. Modified Examples>

The embodiment of the present disclosure has been described so far. Although the embodiment has been described with the example in which photocatalysts are formed in an area for operation detection and an area for information display at different concentration, the present technology is not limited to the example. The technical ideas of the present disclosure are to form photocatalysts at ununiform concentration. It is merely an example of the technical ideas of the present disclosure to form photocatalysts in an area for operation detection and an area for information display at different concentration. According to the technical ideas of the present disclosure, the following modified examples can also be implemented, for example.

Figure 6:
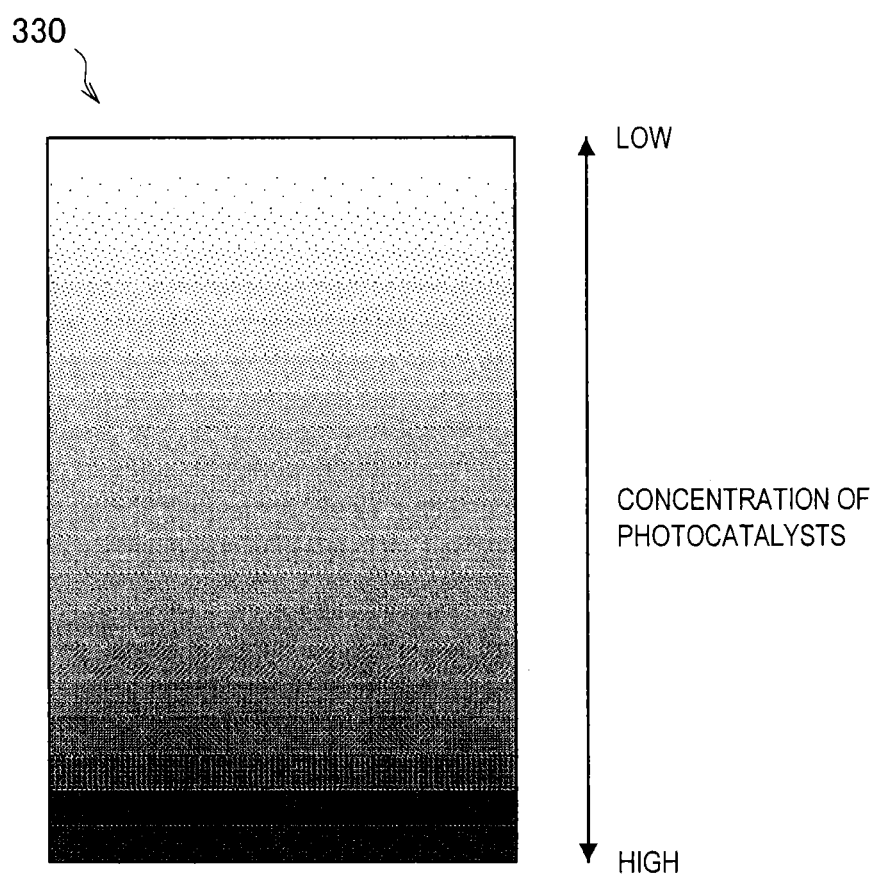
FIG. 6 is an explanatory diagram illustrating a first modified example of a photocatalytic layer.
Figure 7:
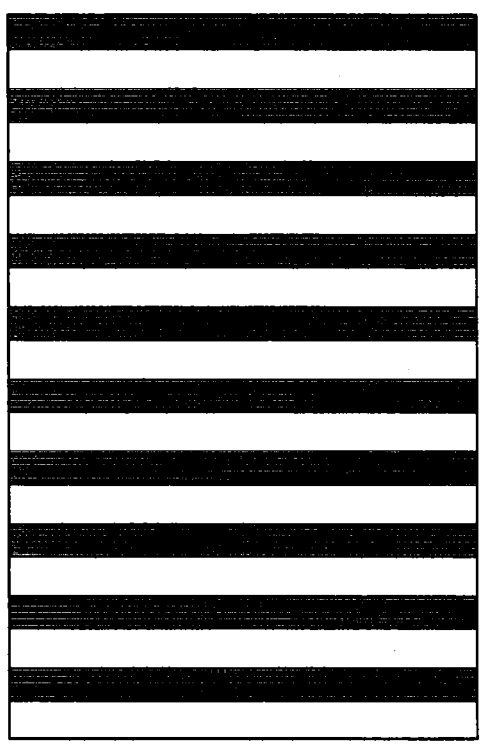
FIG. 7 is an explanatory diagram illustrating a second modified example of a photocatalytic layer.
Figure 7:
Figure 7:

FIG. 6 is an explanatory diagram illustrating a first modified example of the photocatalystic layer 330. The photocatalystic layer 330 may have the concentration of photocatalysts continuously change in one direction as illustrated in FIG. 6. FIG. 7 is an explanatory diagram illustrating a second modified example of the photocatalystic layer 330. The photocatalystic layer 330 may alternately have areas having photocatalysts at high concentration and areas having photocatalysts at low concentration as illustrated in FIG. 7.

Figure 8:
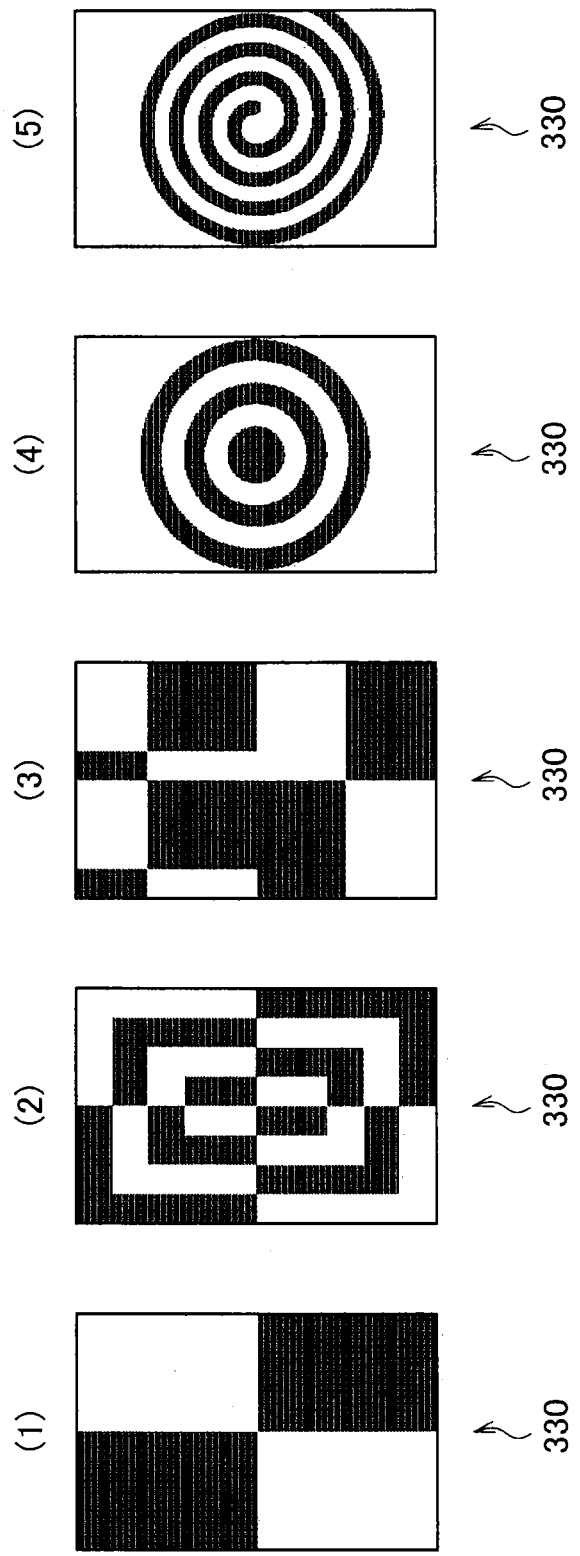
FIG. 8 is an explanatory diagram illustrating a further modified example of a photocatalytic layer.

FIG. 8 is an explanatory diagram illustrating a further modified example of the photocatalystic layer 330. The photocatalystic layer 330 may have four areas obtained by halving each height and width, and photocatalysts having the same concentration may be formed in two areas positioned on the same diagonal as illustrated in (1) of FIG. 8. The concentration distribution of photocatalysts in the photocatalystic layer 330 may have the same pattern in the two areas positioned on the same diagonal among the four areas obtained by halving each height and width as illustrated in (2) of FIG. 8. The photocatalystic layer 330 may also have a combination of rectangular areas in which photocatalysts are formed at high or low concentration as illustrated in (3) of FIG. 8. The photocatalystic layer 330 may include a plurality of areas shaped as concentric circles having photocatalysts at different concentration as illustrated in (4) of FIG. 8. The photocatalystic layer 330 may include a spiral area in which photocatalysts are formed at the same concentration as illustrated in (5) of FIG. 8.

<4. Conclusion>

As described above, according to an embodiment of the present disclosure, photocatalysts are formed in an area for operation detection at lower concentration than in an area for information display. Such a configuration reduces the amount of current noise caused in an area for operation detection because of oxidization-reduction reactions, so that it is possible to ensure the accuracy of operation detection in the area for operation detection. Meanwhile, an area for information display, at which users are more likely to gaze, has an enhanced capacity for decomposing extraneous matters, so that the visibility of the area for information display can be improved.

The preferred embodiment of the present disclosure has been described in detail with reference to the accompanying drawings, but the technical scope of the present disclosure is not limited to those examples. A person skilled in the art can obviously find various alterations and modifications within the scope of the technical ideas in the appended claims, and it should be understood that they will naturally come under the technical scope of the present disclosure.

Additionally, the present technology may also be configured as below.

(1)
An operation detection apparatus including:
an operation detection layer; and
a photocatalystic layer laminated on the operation detection layer,
wherein the photocatalystic layer has an ununiform amount of photocatalysts formed therein.

(2)
The operation detection apparatus according to (1), further including:
a display unit,
wherein the operation detection layer is laminated on a display surface of the display unit.

(3)
The operation detection apparatus according to (1) or (2),
wherein the operation detection layer includes an electrode configured to detect an electrical signal in an area of an operation surface.

(4)
The operation detection apparatus according to (1) to (3),
wherein the photocatalystic layer includes a first area and a second area, and
wherein an amount of photocatalysts per unit area is different in the first area and the second area.

(5)
The operation detection apparatus according to (4),
wherein the first area includes an area for operation detection of the operation detection layer, and
wherein an amount of photocatalysts per unit area in the first area is smaller than an amount of photocatalysts per unit area in the second area.

REFERENCE SIGNS LIST 20 mobile terminal
30 touch panel
310 display unit 320 operation detection layer
322 electrode layer
324 insulating layer
326 electrode layer
330 photocatalystic layer

The invention claimed is:

1. An operation detection apparatus, comprising:
   an operation detection layer; and
   a photocatalystic layer laminated on the operation detection layer,
   wherein the photocatalystic layer has an ununiform amount of photocatalysts formed therein,
   wherein the amount of photocatalysts formed is based on an area on the photocatalystic layer for operation detection and an area on the photocatalystic layer for information display, and
   wherein the photocatalystic layer have a concentration of the photocatalysts continuously changing along an edge traversing from the operation detection area toward the information display area.

2. The operation detection apparatus according to claim 1, further comprising:
   a display unit,
   wherein the operation detection layer is laminated on a display surface of the display unit.

3. The operation detection apparatus according to claim 1, wherein the operation detection layer includes an electrode configured to detect an electrical signal in the area for the operation detection.

4. The operation detection apparatus according to claim 1, wherein the photocatalystic layer includes a first area and a second area, and
   wherein an amount of photocatalysts per unit area is different in the first area and the second area.

5. The operation detection apparatus according to claim 4, further comprising:
   wherein the first area includes the area for the operation detection of the operation detection layer, and
   wherein an amount of photocatalysts per unit are in the first area is smaller than an amount of photocatalysts per unit are in the second area.

6. The operation detection apparatus according to claim 1, wherein the photocatalysts are made of Tungsten.

\* \* \* \* \*